US010631061B2

United States Patent
Sprenger et al.

(10) Patent No.: US 10,631,061 B2
(45) Date of Patent: Apr. 21, 2020

(54) SYSTEM AND METHOD FOR DISPLAYING AND INTERACTING WITH NOTIFICATIONS

(71) Applicant: CenturyLink Intellectual Property LLC, Denver, CO (US)

(72) Inventors: Michael D. Sprenger, Boulder, CO (US); Steven M. Casey, Littleton, CO (US); Katie S. Feiman, Englewood, CO (US); Zubin Ingah, Centennial, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 15/966,387

(22) Filed: Apr. 30, 2018

(65) Prior Publication Data

US 2019/0335245 A1  Oct. 31, 2019

(51) Int. Cl.
*H04N 5/445* (2011.01)
*G06F 3/00* (2006.01)
*H04N 21/488* (2011.01)
*H04N 21/2187* (2011.01)
*H04N 21/431* (2011.01)
*H04N 21/433* (2011.01)

(52) U.S. Cl.
CPC ..... *H04N 21/4882* (2013.01); *H04N 21/2187* (2013.01); *H04N 21/4316* (2013.01); *H04N 21/4334* (2013.01)

(58) Field of Classification Search
CPC .................. H04N 21/431; H04N 21/812
See application file for complete search history.

(56) References Cited

U.S. PATENT DOCUMENTS

| 8,681,680 | B2 | 3/2014 | Mao | |
|---|---|---|---|---|
| 9,544,637 | B2 * | 1/2017 | Roberts | H04N 21/4312 |
| 2006/0034583 | A1 | 2/2006 | Shimizu | |
| 2008/0036794 | A1 * | 2/2008 | Weiser | G06Q 10/107 |
| | | | | 345/689 |
| 2009/0307721 | A1 * | 12/2009 | Afram | H04N 5/44543 |
| | | | | 725/34 |
| 2011/0072452 | A1 | 3/2011 | Shimy | |
| 2013/0347029 | A1 * | 12/2013 | Tang | H04N 21/43 |
| | | | | 725/32 |
| 2014/0359140 | A1 * | 12/2014 | Shankarraman | H04L 65/1069 |
| | | | | 709/227 |
| 2014/0368734 | A1 | 12/2014 | Hoffert | |
| 2015/0163559 | A1 | 6/2015 | Manchester | |

(Continued)

*Primary Examiner* — Gigi L Dubasky

(57) ABSTRACT

Novel tools and techniques are provided for implementing notifications on a display device, and more particularly, for implementing, interacting with, and displaying notifications associated with media content on a display device. In various embodiments, a media player might receive one or more notifications associated with media content. The media player might further receive user interaction with the one or more notifications. The user interaction might cause the media content to be displayed on a second display device, the media content to be displayed after a program being currently viewed by a user has ended, a preview of the media content to be displayed, a live stream of the media content to be displayed in the notification, the media content to be placed in a queue, the media content to be recorded, or a recording of the media content to be deleted.

19 Claims, 7 Drawing Sheets

(56) References Cited

U.S. PATENT DOCUMENTS

| | | | |
|---|---|---|---|
| 2016/0062962 A1* | 3/2016 | Segal | H04N 21/4722 715/719 |
| 2016/0219330 A1* | 7/2016 | Parker | H04N 21/4122 |
| 2016/0255406 A1* | 9/2016 | Soh | H04N 21/4263 725/32 |
| 2016/0360262 A1 | 12/2016 | Matejka | |

* cited by examiner

SYSTEM AND METHOD FOR DISPLAYING AND INTERACTING WITH NOTIFICATIONS

CROSS REFERENCE TO RELATED APPLICATIONS

This application may be related to one or more of the following: U.S. application Ser. No. 15/966,908 (the "'908 applications"), filed on Apr. 30, 2018 by Michael Sprenger et al., entitled, "Method and System for Implementing Auto-Switching or Auto-Playing Video Content"; and U.S. patent application Ser. No. 15/967,066 (the "'066 application"), filed on Apr. 30, 2018 by Michael Sprenger et al., entitled, "Method and System for Implementing Auto-Switching or Auto-Playing Video Content."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing notifications on a display device, and more particularly, to methods, systems, and apparatuses for implementing, interacting with, and displaying notifications associated with media content on a display device.

BACKGROUND

Currently, display devices are configured to display notifications associated with media content on a display screen. However, many of these notifications are displayed prominently in the center of the display screen. Additionally, the notifications that are displayed lack a variety of different ways for the user to interact with the notification and/or the media content associated with the notification.

Hence, there is a need for more robust and scalable solutions for implementing notifications on a display device, more particularly, to methods, systems, and apparatuses for implementing, interacting with, and displaying notifications associated with media content on a display device.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
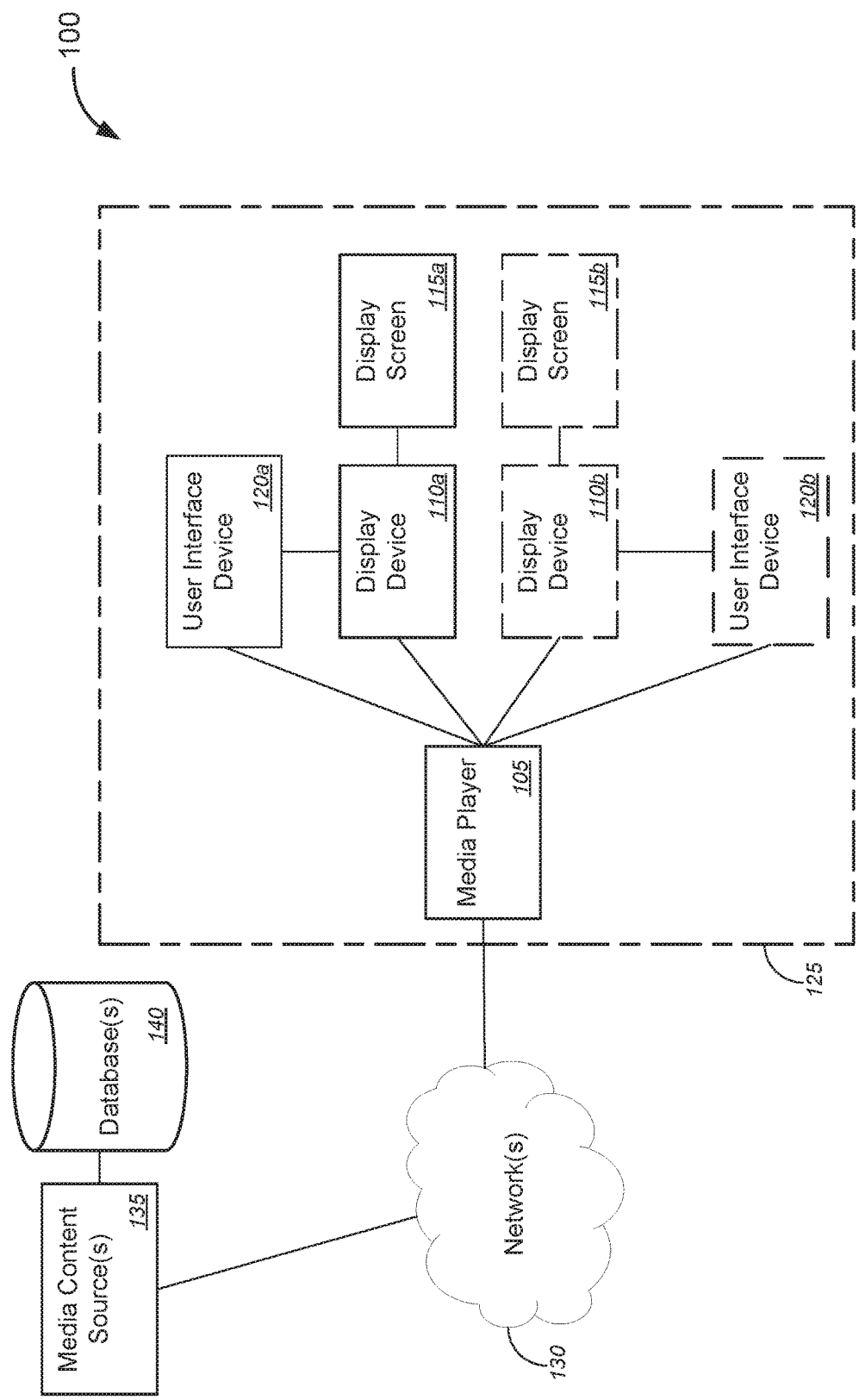
FIG. 1 is a schematic diagram illustrating a system for implementing notifications associated with media content, in accordance with various embodiments.

Various embodiments provide tools and techniques for implementing notifications on a display device, more particularly, to methods, systems, and apparatuses for implementing, interacting with, and displaying notifications associated with media content on a display device.

In various embodiments, a media player might receive one or more notifications associated with media content and display the one or more notifications associated with the media content on a display device. The media player might further receive user interaction with the one or more notifications associated with the media content. The user interaction might cause at least one of media content currently being viewed by the user to switch with the media content displayed in the one or more notifications, the media content to be displayed on a second display device, the media content to be displayed after a program being currently viewed by a user has ended, a preview of the media content to be displayed, a live stream of the media content to be displayed in the notification, the media content to be placed in a queue of additional media content that the user has indicated an interest in viewing, the media content to be recorded, a season of the media content to be recorded, a series of the media content to be recorded, or a recording of the media content to be deleted, and/or the like.

Based on the user interaction, the media player might switch the media content currently being viewed by the user with the media content displayed in the one or more notifications, display at least one of the media content on a second display device, display the media content after a program being currently viewed by a user has ended, display a preview of the media content, display a live stream of the media content in the one or more notifications associated with the media content, place the media content in a queue of additional media content that the user has indicated an interest in viewing, record the media content, record a season of the media content, record a series of the media content, or delete a recording of the media content, and/or the like.

In sum, the various embodiments provide a media player that implements and displays one or more notifications associated with media content in unique ways. Further, the media player provides novel ways to interact with the one or more notifications associated with the media content.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, media content streaming or recording technology, or video communication technology, and/or the like. In other aspects, certain embodiments, can improve the functioning of user equipment or systems themselves (e.g., media players, set-top boxes ("STBs"), media content streaming, recording systems, display devices, etc.), for example, improving implementing, interacting with, and displaying notifications associated with media content on a display device provides for smoother and more efficient presentation of video content and notifications to the user. In particular, to the extent any abstract concepts are present in the various embodiments, those concepts can be implemented as described herein by devices, software, systems, and methods that involve specific novel functionality (e.g., steps or operations), such as, receiving, with a media player, one or more notifications associated with media content, displaying, with the media player, the one or more notifications associated with the media content on a first display device, and receiving, with the media player, user interaction with the one or more notifications associated with the media content, wherein the user interaction causes the media content currently being viewed by the user to switch with the media content displayed in the one or more notifications, the media content currently being viewed by the user to switch with the media content displayed in the one or more notifications, at least one of the media content to be displayed on a second display device, the media content to be displayed after a program being currently viewed by a user has ended, a preview of the media content to be displayed, a live stream of the media content to be displayed in the notification, the media content to be placed in a queue of additional media content that the user has indicated an interest in viewing, the media content to be recorded, a season of the media content to be recorded, a series of the media content to be recorded, or a recording of the media content to be deleted, and/or the like, which provides for smoother and more efficient presentation of video content and/or notifications to the user, to name a few examples, that extend beyond mere conventional computer processing operations. These functionalities can produce tangible results outside of the implementing computer system, including, merely by way of example, smoother and more efficient presentation of video content and/or notifications to the user, at least some of which may be observed or measured by customers and/or service providers.

In an aspect, a method might comprise receiving, with a media player, one or more notifications associated with media content; displaying, with the media player, the one or more notifications associated with the media content on a first display device; and receiving, with the media player, user input indicating user interaction with the one or more notifications associated with the media content. The user input might cause at least one of the media content currently being viewed by the user to switch places with media content displayed in at least one of the one or more notifications, the media content to be displayed on a second display device, the media content to be displayed after a program being currently viewed by a user has ended, a preview of the media content to be displayed, a live stream of the media content to be displayed in the notification, the media content to be placed in a queue of additional media content that the user has indicated an interest in viewing, the media content to be recorded, a season of the media content to be recorded, a series of the media content to be recorded, or a recording of the media content to be deleted, and/or the like.

In some embodiments, the method might further comprise performing, with the player and/or a display device and based on the user input indicating user interaction with the one or more notifications associated with the media content, at least one of switching the media content currently being viewed by the user to with media content displayed in at least one of the one or more notifications, displaying at least one of the media content on a second display device, displaying the media content after a program being currently viewed by a user has ended, displaying a preview of the media content, displaying a live stream of the media content in the one or more notifications associated with the media content, placing the media content in a queue of additional media content that the user has indicated an interest in viewing, recording the media content, recording a season of the media content, recording a series of the media content, or deleting a recording of the media content, and/or the like.

According to some embodiments, the media player might comprise at least one of a set-top box ("STB"), a digital video recording ("DVR") device, a phone, a desktop computer, a laptop computer, a tablet, a software application running on a disc player, a software application running on a dedicated media hardware player, a server computer, a cloud-based computing system, or a gaming console, and/or the like. The first display device and the second display device might each comprise at least one of a television, a smart television, a video projection system, a phone, a desktop computer, a laptop computer, or a tablet, and/or the like.

Merely by way of example, in some cases, the one or more notifications may be displayed based at least in part on at least one of movement by a user (e.g., one or more gestures of a user such as hand gestures, or arm movements, and/or the like), or movement of a device (e.g., a remote, a mobile telephone, a tablet computer, or a personal digital assistant, and/or the like), and/or the like. Additionally and/or alternatively, the one or more notifications associated with the media content may be displayed based on a determination that the media content indicated by the one or more notifications is about to start, a determination that a commercial break has started, or a determination that a program that a user is viewing has ended.

In some embodiments, the one or more notifications associated with the media content may be displayed unobtrusively in a corner of a screen of a display device. In other embodiments, the one or more notifications may be displayed along an edge of the screen of the display device. The one or more notifications associated with the media content may also be displayed unobtrusively on the display screen via one or more thumbnails. The size, position, alignment, and other factors affecting visual attributes of the notifications and thumbnails may be adjustable by the software or hardware designer/vendor, by the operator offering the service, by the user, or by a combination of some or all of these parties.

In various embodiments, the one or more notifications associated with the media content may be displayed to a user for a predetermined amount of time. In other embodiments the one or more notifications may be displayed until a program the user is currently watching ends or until the media content associated with the one or more notifications ends. Additionally and/or alternatively, the one or more notifications may be displayed only during a commercial break and/or until an end of the commercial break.

In some cases, the one or more notifications may be configured to scroll and/or traverse across a side and/or edge of a screen of the first display device. The one or more notifications associated with the media content may be dismissed when the one or more notifications scrolling and/or traversing across the side and/or edge of the screen of the first display device reach an end of the side of the screen of the first display device. Alternatively, the one or more notifications traversing along an edge of the screen may continue traversing across a side of the screen until a user dismisses or selects the one or more notifications. Additionally, the one or more notifications may pause scrolling across the side of the screen of the display device when a user selects the one or more notifications. The size, position, alignment, scrolling speed, and other factors affecting visual attributes of the notifications and thumbnails may be adjustable by the software or hardware designer/vendor, by the operator offering the service, by the user, or by a combination of some or all of these parties.

The one or more notifications displayed on the display screen may be organized in a variety of different ways. In a non-limiting example, the notifications may be organized based at least in part on at least one of viewing history of a user, views of friends, trends, ratings, live content, video on demand content, or recorded content, and/or the like. Additionally and/or alternatively, the one or more notifications may be organized based on whether the notification contains sponsored content from at least one of an advertiser, a service provider, or a content provider, and/or the like.

In various other embodiments, the one or more notifications associated with the media content may display first video content associated with the media content. The first video content may be at least one of currently broadcasting video content associated with the media content indicated in the notification or a preview of the media content indicated in the notification. Selecting at least one notification of the one or more notifications may cause the first video content in the at least one notification to be displayed on a main screen of the first display device and media content that was previously displayed on the main screen to be displayed in the at least one notification. After a predetermined amount of time has passed, the display device may hide or dismiss the media content being displayed in the at least one notification and continue to display the first video content on the main screen of the display. Alternatively, after a predetermined amount of time has passed, the display device may hide or dismiss the first video content being displayed on the main screen and display the media content that was previously displayed on the main screen and that is currently being displayed in the at least one notification on the main screen of the display.

In some embodiments, the one or more notifications associated with the media content may be displayed based at least in part on at least one of a determination that the media content is associated with viewing habits of a user, a determination that the media content is associated with a recording history of the user, a determination that one or more friends of the user are interested in the media content, a determination that the media content is trending, a determination that the media content is popular, a determination that the media content is sponsored by at least one of an advertiser, a content provider, or a service provider, and/or the like.

In some cases, the one or more notifications associated with the media content may further be hidden or dismissed based on a variety of factors. In a non-limiting example, the one or more notifications may be hidden based at least in part on an expiration of a predetermined amount of time, a movement of a user, a movement of a device, a determination that the media content indicated in the notification has ended, or a determination that a commercial break has ended, and/or the like.

In some embodiments, a user may customize the one or more notifications associated with the media content. A user may be provided with options to customize at least one of a number of the one or more notifications to display, where the one or more notifications are to be displayed on the display device, or how to organize display of the one or more notifications.

Additionally and/or alternatively, the one or more notifications associated with the media content may further indicate one or more devices that are available to display the media content. Selecting the one or more devices in the notification may cause the one or more devices to display the media content.

In another aspect, a media player might comprise at least one processor and a non-transitory computer readable medium communicatively coupled to the at least one processor. The non-transitory computer readable medium might have stored thereon computer software comprising a set of instructions that, when executed by the at least one processor, causes the media player to: receive one or more notifications associated with media content; display the one or more notifications associated with the media content on a display device; and receive user input indicating user interaction with the one or more notifications associated with the media content, wherein the user input causes at least one of the media content currently being viewed by the user to switch with the media content displayed in the one or more notifications, the media content to be the media content currently being viewed by the user to switch with the media content displayed in the one or more notifications displayed on a second display device, the media content to be displayed after a program being currently viewed by a user has ended, a preview of the media content to be displayed, a live stream of the media content to be displayed in the notification, the media content to be placed in a queue of additional media content that the user has indicated an interest in viewing, the media content to be recorded, a season of the media content to be recorded, a series of the media content to be recorded, or a recording of the media content to be deleted.

In some embodiments, the non-transitory computer readable medium might further have stored thereon computer software comprising a set of instructions that, when executed by the at least one processor, causes the media player to: perform, based on the user input indicating user interaction with the one or more notifications associated with the media content, at least one of switching the media content currently being viewed by the user with the media content displayed in the one or more notifications, displaying at least one of the media content on a second display device, displaying the media content after a program being currently viewed by a user has ended, displaying a preview of the media content, displaying a live stream of the media content in the one or more notifications associated with the media content, placing the media content in a queue of additional media content that the user has indicated an interest in viewing, recording the media content, recording a season of the media content, recording a series of the media content, or deleting a recording of the media content, and/or the like.

In yet another aspect, a system might comprise a media player and one or more display devices. The media player might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the media player to: receive one or more notifications associated with media content; display the one or more notifications associated with the media content on the one or more first display devices; and receive user input indicating user interaction with the one or more notifications associated with the media content, wherein the user input causes at least one of the media content currently being viewed by the user to switch with the media content displayed in the one or more notifications, the media content to be displayed on one or more second display devices, the media content to be displayed after a program being currently viewed by a user has ended, a preview of the media content to be displayed, a live stream of the media content to be displayed in the notification, the media content to be placed in a queue of additional media content that the user has indicated an interest in viewing, the media content to be recorded, a season of the media content to be recorded, a series of the media content to be recorded, or a recording of the media content to be deleted.

The one or more first display devices might each comprise a display screen, at least one second processor, and a second non-transitory computer readable medium communicatively coupled to the at least one second processor. The second non-transitory computer readable medium might have stored thereon computer software comprising a second set of instructions that, when executed by the at least one second processor, causes the one or more first display devices to: receive the media content; display, on the display screen, the received media content; receive the one or more notifications associated with the media content from the media player; and display, on a portion of the display screen, the one or more notifications associated with the media content.

In some embodiments, the first and second non-transitory computer readable media of the media player and the one or more first display devices, respectively, might each have further stored thereon computer software comprising a third set of instructions that, when executed by the at least one first or second processor, causes the media player or the one or more first display devices to: perform, based on the user input indicating user interaction with the one or more notifications associated with the media content, at least one of switching the media content currently being viewed by the user with the media content displayed in the one or more notifications, displaying at least one of the media content on a second display device, displaying the media content after a program being currently viewed by a user has ended, displaying a preview of the media content, displaying a live stream of the media content in the one or more notifications associated with the media content, placing the media content in a queue of additional media content that the user has indicated an interest in viewing, recording the media content, recording a season of the media content, recording a series of the media content, or deleting a recording of the media content, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-5 illustrate some of the features of the method, system, and apparatus for implementing notifications on a display device, more particularly, to methods, systems, and apparatuses for implementing, interacting with, and displaying notifications associated with media content on a display device, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 is a schematic diagram illustrating a system 100 for implementing notifications associated with media content, in accordance with various embodiments.

In the non-limiting embodiment of FIG. 1, system 100 might comprise a media player 105. System 100, according to some embodiments, might further comprise one or more display devices 110a and 110b (collectively, "display devices 110" or the like), which might each include a display screen(s) 115a and/or 115b (collectively, "display screens 115" or the like), and one or more user interface devices 120a and/or 120b (collectively, "user interface devices 120" or the like). System 100 might additionally comprise premises 125, network(s) 130, media content source(s) 135, and database(s) 140.

In some cases, the media player 105 might include, but is not limited to, one of a set-top box ("STB"), a gaming console, a server computer, a desktop computer, a laptop computer, a tablet, a mobile phone, a digital video recording ("DVR") device, a streaming video player, a streaming music player, a streaming game player, or a software application running on a disc player, and/or the like. The one or more display devices 110 might include, but are not limited to, a television, a smart television, a video projection system, a phone, a desktop computer, a laptop computer, or a tablet, and/or the like. The one or more display screens 115 might include, without limitation, at least one of one or more monitors (e.g., a computer monitor, a laptop monitor, a tablet monitor, or the like), one or more television screens (e.g., smart television screen or other television screen, or the like), one or more phone screens (e.g., smart phones, or the like), or one or more video projection screens, and/or the like.

In some embodiments, the user interface device(s) 120 might include, without limitation, at least one of a dedicated remote control device (with a touchscreen display and/or other user interface) that is associated with the media player 105 and/or display device 110, a universal remote control device (with touchscreen display and/or other user interface) that has been paired, synced, or synchronized with the media player 105 and/or display device 110, a tablet computer that has been paired, synced, or synchronized with the media player 105 and/or display device 110, a smart phone that has been paired, synced, or synchronized with the media player 105 and/or display device 110, other portable device (with touchscreen display and/or other user interface) that has been paired, synced, or synchronized with the media player 105 and/or display device 110, or one or more sensors integrated into at least one of the media player 105 and/or display devices 110, and/or the like. The user interface of the user interface device 120 might include, but is not limited to, at least one of a touchscreen display(s) or touchscreen display device(s), one or more physical actuators (e.g., buttons, switches, toggles, etc.), one or more virtual actuators (e.g., touchscreen buttons, switches, toggles, slide-bars, etc.), one or more voice interface devices, a gesture interface device(s), or a remote control interface device(s), and/or the like.

The media player 105 might be communicatively coupled to each of the one or more display devices 110 and/or the one or more user interface devices 120 via a wired and/or wireless connection. Each of the display devices 110 might be communicatively coupled to each of the display screens 115 and/or the one or more user interface devices 120 via a wired and/or wireless connection.

The one or more user interface devices 120 might each receive user input from a user (in various embodiments, receiving touch input from the user via a touchscreen display; in some embodiments, receiving voice input from the user via a voice interface device; in some instances, receiving gesture input from the user via a gesture interface device; in some cases, receiving physical user input from the user via one or more physical actuators, or the like; according to some embodiments, receiving remote control input via a remote control interface device; etc.), and might each relay the user input to the media player 105 and/or display device 110, according to some embodiments.

In some cases, the media player 105, the one or more display devices 110 (including the display screen(s) 115), and the user interface device(s) 120 may be disposed within a customer premises 125, which might be one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, or an industrial building or complex, and/or the like.

The media player 105 might communicatively couple to each of the one or more display devices 110 and/or the one or more user interface devices 120 (and, in some cases, to one or more of the audio playback devices, or the like) via wireless connection, via the integrated wireless video link system. Each of the one or more display devices 110 and/or the one or more user interface devices 120 might communicatively couple to one or more of the audio playback devices, and/or to each other, either via wireless connection and/or via wired connection. The one or more user interface devices 120 might each receive user input from a user (in various embodiments, receiving touch input from the user via a touchscreen display; in some embodiments, receiving voice input from the user via a voice interface device; in some instances, receiving gesture input from the user via a gesture interface device; in some cases, receiving physical user input from the user via one or more physical actuators, or the like; according to some embodiments, receiving remote control input via a remote control interface device; etc.), and might each relay the user input to the media player 105, according to some embodiments.

System 100 might further comprise one or more media (e.g., video, audio, or game) content sources or servers 135 and corresponding database(s) 140 that might communicatively couple to the media player 105 via one or more networks 130 (and, in some cases, via one or more telecommunications relay systems, which might include, without limitation, one or more wireless network interfaces (e.g., wireless modems, wireless access points, and the like), one or more towers, or one or more satellites, and/or the like). In operation, the media player 105 might receive a video signal from media content source(s) 135 via network 130 (and/or the database(s) 140 via the media content source(s) 135, or the like), might decode the received video signal, might establish a wireless communications link between the media player 105 and the one or more display devices 110, and might send the decoded video signal to the one or more display devices 110.

Additionally and/or alternatively, in operation, the media player 105 might receive one or more notifications associated with media content from media content source(s) 135, from the database(s) 140 via the media content source(s) 135, from one or more other databases communicatively coupled to the media player 105 via network 130, and/or the like, might establish a wireless communications link between the media player 105 and the one or more display devices 110, and might send the one or more notifications associated with media content to the one or more display devices 110.

The media player 105 and/or display device 110 may then display the one or more notifications associated with the media content on the display screen 115. The media content may include textual content, audio content, image content, or video content, and/or the like. A user may interact with the one or more notifications associated with the media content via user interface device 120. The user interaction may cause at least one of the media content currently being viewed by the user to switch with the media content displayed in at least one of the one or more notifications, the media content to be displayed on a second display device, the media content to be displayed after a program being currently viewed by a user has ended, a preview of the media content to be displayed, a live stream of the media content to be displayed in the notification, the media content to be placed in a queue of additional media content that the user has indicated an interest in viewing, the media content to be recorded, a season of the media content to be recorded, a series of the media content to be recorded, or a recording of the media content to be deleted, and/or the like. In some cases, the user interaction may additionally and/or alternatively cause the media content displayed in the notification to switch places with the media content currently being viewed by a user. In other words, the media content displayed in the notification may be displayed on the entire display screen 115 while the media content that was currently being viewed by a user is displayed in the one or more notifications.

In some embodiments, if the user selects for the media content to be viewed next (after a program the user is currently viewing). The media player 105 might cause the media content associated with the notification to be recorded via a digital video recorder and/or the like. The media player 105 might next determine whether the program the user is currently viewing has ended (e.g., by determining whether the user is viewing the credits of a program or show). Based on a determination that the program the user is currently viewing has ended, the media player 105 might automatically play the media content selected to be viewed next, without additional user input.

A similar method might be used when the media content is placed in a queue. If the user selects for the media content to be placed in a queue, the media player 105 might cause the media content associated with the notification to be recorded via a digital video recorder, and/or the like. The user may select to place the media content associated with the notification at any location within the queue. For example, the user may select to place the media content at the beginning of the queue, at the end of the queue, and/or in the middle of the queue. The media player 105 might next determine whether the media content associated with the notification is next in the queue. Based on a determination that the media content is next in the queue and the preceding program has ended (e.g. a user is currently viewing the credits of a program or show), the media player 105 might automatically play the media content that is next in the queue, without additional user input.

A variety of factors may be used to determine when to display the one or more notifications associated with the media content. For example, a media player 105, a service provider, or a network provider, and/or the like, may track the viewing and/or recording habits of a user of the media player 105 or digital video recorder to determine media content that the user is likely interested in viewing. Additionally and/or alternatively, viewing and/or recording habits of one or more friends of a user may be tracked to determine media content to recommend to a user. Friends of a user may be determined based on a user's social media site, contacts in a mobile phone, or contacts in an email, and/or the like. In other embodiments, a media player 105, a service provider, or a network provider, and/or the like, may track may track media content that is currently trending on social media, news websites, and/or the like, to determine media content to recommend to a user. When media content related to viewing and/or recording habits of a user, viewing and/or recording habits of one or more friends of a user, and/or trending media content is found, the media player 105, the service provider, or the network provider, and/or the like, may push one or more notifications to the media player 105 for display on the one or more display devices 110. Users are able to select whom they share their viewing habits with and what categories of content to share.

In some embodiments, the one or more notifications associated with the media content may further indicate why particular media content is being recommended. In a non-limiting example, the one or more notifications associated with the media content may indicate that the media content is related to media content the user viewed or recorded, the media content was viewed and/or recorded by one or more friends, the media content was trending on a social network site, new site, and/or the like. The one or more notifications may further indicate particular friends interested in the media content and/or particular social networking sites where the media content is trending.

These and other functions of the system 100 (and its components) are described in greater detail below with respect to FIGS. 2 and 3.

FIGS. 2A-2D (collectively, "FIG. 2") are schematic diagrams illustrating different display screens for implementing notifications associated with media content, in accordance with various embodiments. It should be noted that although FIGS. 2A-2D are described separately, different functionalities described in each of the embodiments of FIGS. 2A-2D may be integrated or removed in the embodiments described in FIGS. 2A-2D.

Figure 2A:
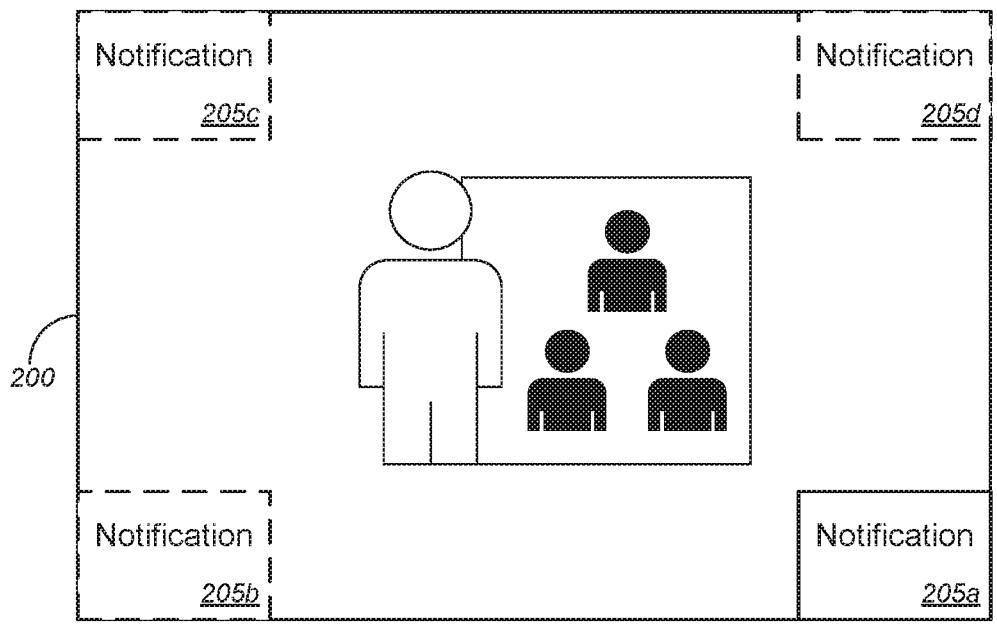
FIGS. 2A-2D are schematic diagrams illustrating different display screens for implementing notifications associated with media content, in accordance with various embodiments.

FIG. 2A is a schematic diagram illustrating a display screen 200 for displaying one or more notifications 205a-205d (collectively, "user notifications 205" or the like) associated with media content. The one or more notifications 205 may be one or more thumbnails. The size, position, alignment, and other factors affecting visual attributes of the thumbnails may be adjustable by the software or hardware designer/vendor, by the operator offering the service, by the user, or by a combination of some or all of these parties.

As shown in FIG. 2A, one or more notifications 205 may be displayed unobtrusively in a corner of the display screen 200. For example, notification 205a is displayed in the bottom-right corner of the display screen 200. The one or more notifications 205 may also be located in other places on the display screen 200 such as the bottom-left corner (e.g., notification 205b), the top-left corner (e.g., notification 205c), or the top-right corner (e.g., notification 205d), and/or the like.

The location of each of the one or more notifications 205 is not limited to a corner of the display screen 200. Instead, each of the one or more notifications 205 may be arranged unobtrusively along an edge of the display screen 200. Additionally, a user, a service provider, or a network provider, and/or the like, may select a location, size, alignment, and other factors affecting visual attributes of the notifications used to display the one or more notifications 205 on display screen 200.

In some embodiments, the one or more notifications 205 may indicate a particular user that may be interested in the media content associated with the notification. For example, in a family, the one or more notifications 205 may indicate that the mother of the family may be interested in the media content. Additionally and/or alternatively, the one or more notifications 205 may indicate a group of users that may be interested in the media content. In a non-limiting example, the one or more notifications 205 may indicate that an entire family may be interested in the media content.

In some embodiments, a user may log into a display device, media player, and/or the like. Alternatively, the display device or media player, and/or the like, may determine a user who is using the display device, media player, and/or the like based on viewing habits of the user. Once the display device, media player, and/or the like determines an identity of a particular user using the display device, media player, and/or the like, the display device, media player, and/or the like may display one or more notifications 205 associated with the particular user.

The one or more notifications 205 may be displayed based in part on at least one of a determination that the media content is associated with viewing habits of a user, a determination that the media content is associated with a recording history of the user, a determination that one or more friends of the user are interested in the media content, a determination that the media content is trending, a determination that the media content is popular, a determination that the media content is sponsored by an advertiser, content provider, or a service provider, and/or the like.

When a user interacts with the one or more notifications 205 associated with the media content, the user interaction may cause at least one of media content currently being viewed by the user to switch with the media content displayed in the one or more notifications 205, the media content associated with the one or more notifications 205 to be displayed, the media content to be displayed on at least one second display device, the media content to be displayed after a program being currently viewed by a user has ended, a preview of the media content to be displayed, a live stream of the media content to be displayed in the notification, the media content to be placed in a queue of additional media content that the user has indicated an interest in viewing, the media content to be recorded, a season of the media content to be recorded, a series of the media content to be recorded, or a recording of the media content to be deleted.

The one or more notifications 205 may further indicate one or more second devices that are available to display the media content associated with the one or more notifications 205. The one or more second devices may be separate and different from the display device 200.

In some embodiments, based on the user interaction with the one or more notifications 205 associated with the media content, the media content currently being viewed by the user may be switched with the media content displayed in the one or more notifications 205, the media content may be displayed on the display device 200, the media content may be displayed on a second display device that is different from the display device 200, the media content may be displayed after a program being currently viewed by a user has ended, a preview of the media content may be displayed in the one or more notifications 205 and/or on the display device 200, a live stream of the media content may be displayed in the one or more notifications 205 associated with the media content, the media content may be placed in a queue of additional media content that the user has indicated an interest in viewing, the media content may be recorded, a season of the media content may be recorded, a series of the media content may be recorded, or a recording of the media content may be deleted, and/or the like. The preview of the media content may be at least one of a movie poster, a looped presentation of still images, or looped video content such as a trailer or excerpt from the media content or metadata about the content (e.g., title, director(s), actor(s), participant(s), location information, trivia, etc.), and/or the like.

The one or more notifications 205 may be displayed for at least one of a pre-determined amount of time (which may be configurable by a user, a service provider, or a network provider, and/or the like), through the end of a program the user is currently watching, or through the end of the media content associated with the notification 205. Additionally and/or alternatively, the one or more notifications 205 may be configured to be displayed during a commercial break and/or dismissed after a commercial break has ended.

In some cases, the one or more notifications 205 may display a countdown timer that indicates an amount of time left before the one or more notifications 205 are dismissed and/or hidden. Additionally and/or alternatively, the one or more notifications 205 may blink to indicate that the one or more notifications 205 are about to be dismissed or hidden. The one or more notifications 205 may be dismissed and/or hidden after the countdown timer and/or blinking ends.

In various embodiments, a user may dismiss, hide, and/or reveal the one or more notifications 205. The user may dismiss, hide, and/or reveal the one or more notifications 205 through user interaction with a user interface device (e.g., by receiving touch input from the user via a touchscreen display; by receiving voice input from the user via a voice interface device; by receiving gesture input from the user via a gesture interface device; by receiving physical user input from the user via one or more physical actuators, or the like). In a non-limiting example, particular movements made by a user and/or a device the user is holding/interacting with may dismiss, hide, and/or reveal one or more notifications 205. For example, a user may gesture (using a hand, remote, mobile phone, or tablet, and/or the like) toward the perimeter and/or edge of the display screen 200 to dismiss and/or hide the one or more notifications 205. Additionally and/or alternatively, a user may gesture toward the center of the display screen 200 to reveal one or more hidden notifications.

A bar displayed on the perimeter of the display screen 200 may be used to visually indicate one or more hidden notifications. A user may then select the hidden bar via touch input, voice input, gesture input, physical user input via one or more physical actuators, or the like to reveal the one or more notifications 205 associated with media content.

In some embodiments, the one or more notifications 205 associated with media content may be temporarily hidden. The one or more notifications 205 may be redisplayed after a predetermined amount of time has passed. In other embodiments, the one or more notifications 205 may reappear during a commercial break, at the end of a show a user is currently viewing, during the ending credits of a show a user is currently viewing, when the media content associated with the one or more notifications is about to start, and/or the like. Additionally and/or alternatively, a user may select a specific time (e.g., time of day, etc.) for notifications 205 to be shown on the display screen 200.

When a notification is displayed on display screen 200, a user may receive an additional notification on a second display device and/or user device that is separate from the display screen 200. In a non-limiting example, when a notification is displayed on a television screen, a user may receive an additional notification associated with the media content via a mobile phone, or tablet, and/or the like. The notification on the mobile phone or tablet, and/or the like, may be an indication that a notification has been displayed on the display screen 200 and/or it may be the same notification that is displayed on the display screen 200.

Figure 2B:
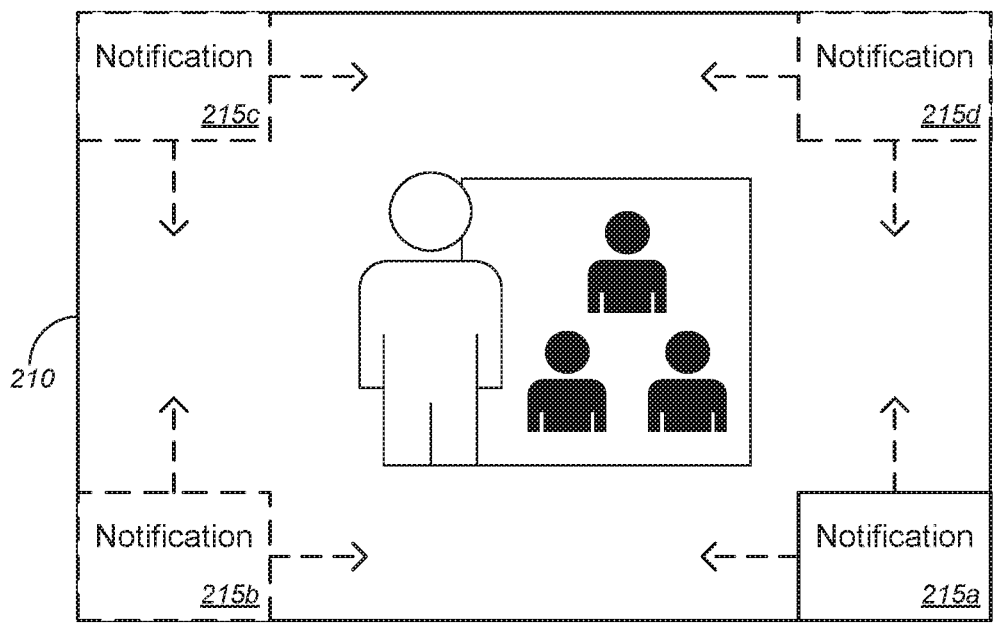

FIG. 2B is a schematic diagram illustrating a display screen 210 for displaying one or more notifications 215a-215d (collectively, "user notifications 215" or the like) for media content. Display screen 210 may correspond to display screen 200 shown in FIG. 2A. Additionally, the one or more notifications 215 may correspond to the one or more notifications 205 shown in FIG. 2A.

In various embodiments, the one or more notifications 215 may be configured to traverse and/or scroll along an edge or a perimeter of display screen 210, as indicated by the arrows in FIG. 2B. The one or more notifications 215 associated with the media content may be dismissed and/or hidden when the one or more notifications 215 scrolling across the side of the screen of the display device reach an end of the side of the screen of the display device 210. Alternatively, the one or more notifications 215 may continue to a scroll along an edge of the screen 210 until a user selects via touch input, voice input, gesture input, or physical user input, and/or the like, to dismiss the one or more notifications 215 and/or a predetermined amount of time passes. When a user selects the one or more notifications 215, the one or more notifications 215 may pause scrolling across the side of the screen of the display device until the user deselects the one or more notifications 215.

Figure 2C:
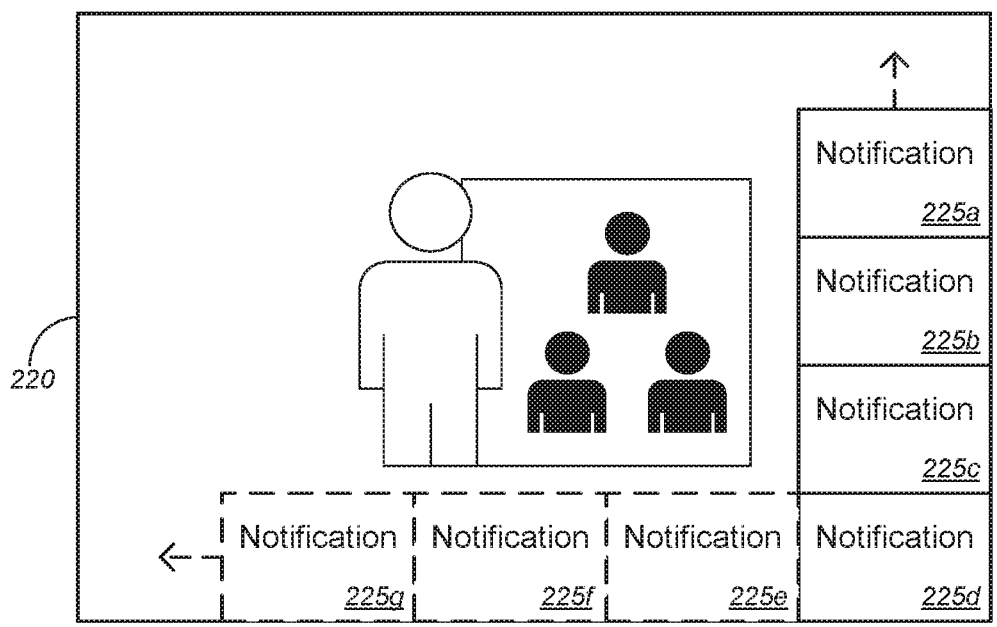

FIG. 2C is a schematic diagram illustrating a display screen 220 for displaying a plurality of notifications 225a-225g (collectively, "notifications 225" or the like) for media content. Display screen 220 may correspond to display screen 200 shown in FIG. 2A and/or display screen 210 shown in FIG. 2B. Additionally, the one or more notifications 225 may correspond to the one or more notifications 205 shown in FIG. 2A and/or one or more notifications 215 shown in FIG. 2B. The plurality of notifications 225 may be one or more thumbnails. The size, position, alignment, and other factors affecting visual attributes of the notifications and thumbnails may be adjustable by the software or hardware designer/vendor, by the operator offering the service, by the user, or by a combination of some or all of these parties.

In various embodiments, instead of displaying only one notification and plurality of notifications 225 may be displayed. Like the one or more notifications 205 displayed in FIG. 2A, the plurality of notifications 225 may be statically displayed on display device 220. Alternatively, the plurality of notifications 225, like the one or more notifications 215 displayed in FIG. 2B, may traverse along an edge of the display screen 220. When a notification 225a reaches the end of a side of the display device 220, the notification 225a may be redisplayed at the end of the plurality of 225 and/or the notification 225a may be dismissed and/or hidden.

In some cases, the plurality of notifications 225 may be displayed unobtrusively in a corner of the display screen 220. The location of the plurality of notifications 225 is not limited to a corner of the display screen 220. Instead, the plurality of notifications 225 may be arranged unobtrusively along an edge of the display screen 220. Additionally, a user, a service provider, or a network provider, and/or the like, may select a location to display the plurality of notifications 225 on display screen 220.

In some embodiments, a user, service provider, and/or the like may customize the plurality of notifications 225. The user, service provider, and/or the like may customize where to display the one or more notifications 225, a number/amount of notifications 225 to display, how to organize the one or more notifications 225, or the size of the one or more notifications, and/or the like. The one or more notifications 225 may be organized and/or displayed based on at least one of a viewing history of a user, views of friends of the user, trending content, ratings of media content, live media content, or video-on-demand content, and/or the like.

In various non-limiting embodiments, users may create one or more user notification profiles associated with media content. Each notification profile may indicate one or more notifications 225 a user wishes to receive. Each notification profile may be different for each user and/or for each display device. In other words, a notification profile for one user may be different for a mobile phone, tablet, and/or TV.

Notifications 225 may then be displayed based on user and/or device notification profiles. In a non-limiting example, a mother may record a show. When the mother logs into her profile and/or a device determines that the mother is using a particular device, the particular device may notify the mother that her show has been recorded and is ready to view. The device may determine a user who is using the display device based on viewing habits of the user and display one or more notifications 225 associated with viewing habits of the user.

Additionally and/or alternatively, one or more notifications 225 may be addressed to a group of users, e.g., an entire household, a family, parents, or social network group, and/or the like. For example, notifications may recommend media content that may be of interest to a particular group of users and indicate which group of users will be interested in the media content.

Figure 2D:
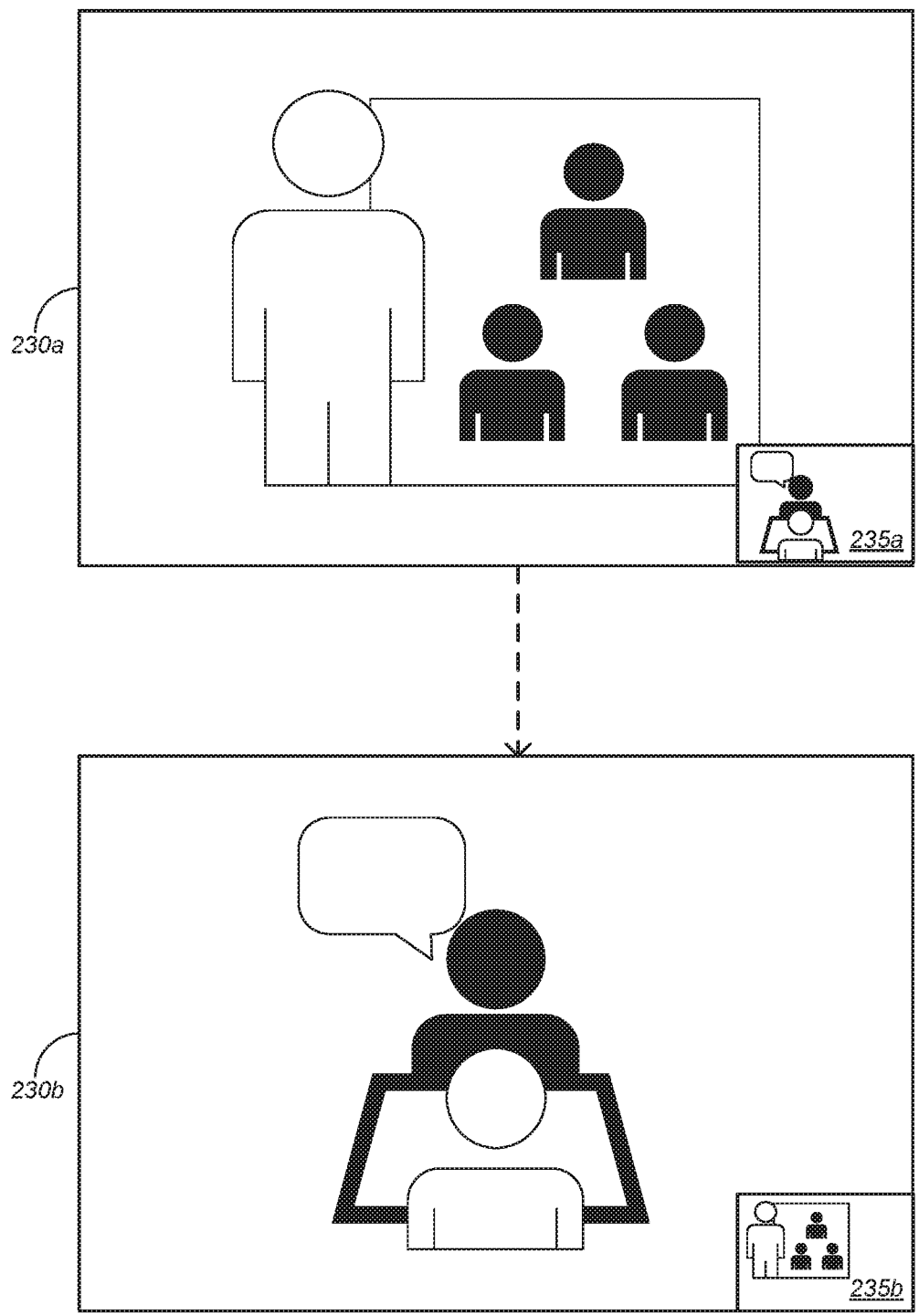

FIG. 2D is a schematic diagram illustrating a display screen 230a and 230b (collectively, "display screen 230" or the like) for displaying one or more non-intrusive notifications 235a and 235b (collectively, "one or more notifications 235" or the like) for media content. Display screen 230 may correspond to display screen 200 shown in FIG. 2A, display screen 210 shown in FIG. 2B, and/or display screen 220 shown in FIG. 2C. Additionally, the one or more notifications 235 may correspond to the one or more notifications 205 shown in FIG. 2A, one or more notifications 215 shown in FIG. 2B, and/or the one or more notifications shown in FIG. 2C.

As shown in FIG. 2D, one or more notifications 235a may display media content on display screen 230a. The media content displayed in the one or more notifications 235a may be at least one of a still image such as a movie or TV poster, an image of an actor, or a cover of a movie or TV show, and/or the like. Additionally and/or alternatively, the media content displayed in the one or more notifications 235a may be video content such as a preview of the media content, a trailer of the media content, a live video feed/broadcast of the media content, or a description of the media content, and/or the like. The video content may be looped within the one or more notifications 235a and continuously played until the one or more notifications 235a are dismissed.

In various embodiments, selecting the one or more notifications 235a may cause the media content to be displayed in the one or more notifications 235a. Alternatively, the notification 235a may display the media content when the notification 235a is first displayed. The media content displayed in the one or more notifications 235a may be muted until a user selects the one or more notifications 235a. When a user selects the one or more notifications 235a, the audio of the media content being displayed on the display screen 230a may be muted and the audio of the media content being displayed in the one or more notifications 235a may be unmuted.

Additionally, in some embodiments, selecting the one or more notifications 235a may cause the media content (e.g., the still image and/or video content) to be displayed on a main screen of the display device 230a and the media content that was previously displayed on the main screen of the display device 230a to be displayed in the at least one notification 235b. In other words, content on the main screen of display device 230a switches with content displayed in the one or more notifications 235a to become a thumbnail or a Picture-in-Picture (PIP). The content contained within the notification 235a may then be shown on main screen of the display device 230b.

After a predetermined amount of time has passed, the display device 230b may hide and/or dismiss the media content being displayed in the at least one notification and continue to display the first video content on the main screen of the display device. Alternatively, after a predetermined amount of time has passed, the display device might dismiss the first video content being displayed on the main screen and might display the media content that was previously displayed on the main screen and that is currently being displayed in the at least one notification 235b on the main screen of the display device.

Figure 3:
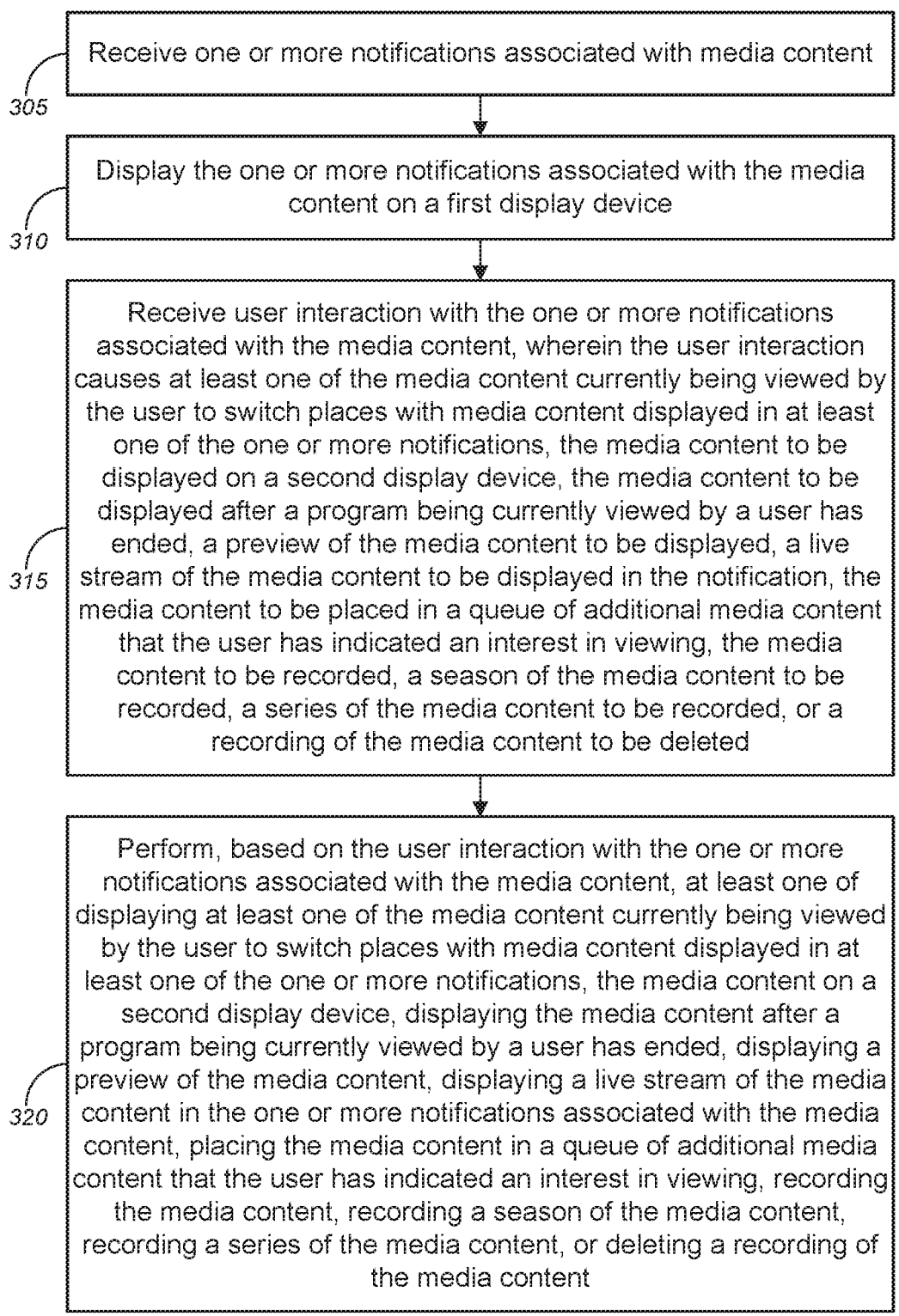
FIG. 3 is a flow diagram illustrating a method for implementing notifications associated with media content, in accordance with various embodiments.

FIG. 3 is a flow diagram illustrating a method 300 for implementing notifications associated with media content, in accordance with various embodiments.

While the techniques and procedures are depicted and/or described in a certain order for purposes of illustration, it should be appreciated that certain procedures may be reordered and/or omitted within the scope of various embodiments. Moreover, while the method 300 illustrated by FIG. 3 can be implemented by or with (and, in some cases, are described below with respect to) the system 100 of FIG. 1 and by the display devices 200, 210, 220, and 230 of FIG. 2 (or components thereof), such methods may also be implemented using any suitable hardware (or software) implementation. Similarly, while each of the system 100 of FIG. 1 and the display devices 200, 210, 220, and 230 of FIG. 2 (or components thereof), can operate according to the method 300 illustrated by FIG. 3 (e.g., by executing instructions embodied on a computer readable medium), the system 100 of FIG. 1 and the display devices 200, 210, 220, and 230 of FIG. 2 can each also operate according to other modes of operation and/or perform other suitable procedures.

In the non-limiting embodiment of FIG. 3, method 300, at block 305, might comprise receiving, with a media player, one or more notifications associated with media content. The one or more notifications may be received from at least one of one or more video content sources, one or more databases, or one or more websites, and/or the like.

The method 300, at block 310, might continue by displaying, with the media player, the one or more notifications associated with the media content on a first display device. According to some embodiments, the media player might include, without limitation, at least one of a set-top box ("STB"), a digital video recording ("DVR") device, a phone, a desktop computer, a laptop computer, a tablet, a software application running on a disc player, a software application running on a dedicated media hardware player, a server computer, a cloud-based computing system, or a gaming console, and/or the like. The display device might include, but is not limited to, at least one of a television, a smart television, a video projection system, a phone, a desktop computer, a laptop computer, or a tablet, and/or the like.

Merely by way of example, in some cases, the one or more notifications may be displayed based at least in part on at least one of movement by a user (e.g., one or more gestures of a user such as hand gestures, or arm movements, and/or the like), movement of a device (e.g., a remote, a mobile telephone, a tablet computer, or a personal digital assistant, and/or the like). Additionally and/or alternatively, the one or more notifications associated with the media content may be displayed based on a determination that the media content indicated by the one or more notifications is about to start, a determination that a commercial break has started, or a determination that a program that a user is viewing has ended.

In some embodiments, the one or more notifications associated with the media content may be displayed in a corner of a screen of a display device. In other embodiments, the one or more notifications may be displayed along an edge of the screen of the display device. The one or more notifications associated with the media content may also be displayed unobtrusively on the display screen via one or more thumbnails. The size, position, alignment, and other factors affecting visual attributes of the notifications and thumbnails may be adjustable by the software or hardware designer/vendor, by the operator offering the service, by the user, or by a combination of some or all of these parties.

In various embodiments, the one or more notifications associated with the media content may be displayed to a user for a predetermined amount of time. In other embodiments, the one or more notifications may be displayed until a program the user is currently watching ends or until the media content associated with the one or more notifications ends. Additionally and/or alternatively, the one or more notifications may be displayed only during a commercial break and/or until an end of the commercial break.

In some cases, the one or more notifications may be configured to scroll and/or traverse across a side and/or edge of a screen of the first display device. The one or more notifications associated with the media content may be dismissed when the one or more notifications scrolling and/or traversing across the side and/or edge of the screen of the first display device reach an end of the side of the screen of the first display device. Alternatively, the one or more notifications traversing along an edge of the screen may continue traversing across a side of the screen until a user dismisses or selects the one or more notifications. Additionally, the one or more notifications may pause scrolling across the side of the screen of the display device when a user selects the one or more notifications.

The one or more notifications displayed on the display screen may be organized in a variety of different ways. In a non-limiting example, the notifications may be organized based at least in part on at least one of viewing history, views of friends, trends, ratings, live content, video on demand content, or recorded content, and/or the like. Additionally and/or alternatively, the one or more notifications may be organized based on whether the notification contains sponsored content from at least one of an advertiser, a service provider, or a content provider, and/or the like.

In various other embodiments, the one or more notifications associated with the media content may display video content associated with the media content. The first video content may be at least one of currently broadcasting video content associated with the media content indicated in the notification or a preview of the media content indicated in the notification. Selecting at least one notification of the one or more notifications displaying the first video content displaying the first video content may cause the first video content in the at least one notification to be displayed on a main screen of the first display device and media content that was previously displayed on the main screen to be displayed in the at least one notification. After a predetermined amount of time has passed, the display device may hide the media content being displayed in the at least one notification and continue to display the first video content on the main screen of the display. Alternatively, after a predetermined amount of time has passed, the display device may hide the first video content being displayed on the main screen and displays the media content that was previously displayed on the main screen and that is currently being displayed in the at least one notification on the main screen of the display.

In some embodiments, the one or more notifications associated with the media content may be displayed based at least in part on at least one of a determination that the media content is associated with viewing habits of a user, a determination that the media content is associated with a recording history of the user, a determination that one or more friends of the user are interested in the media content, a determination that the media content is trending, a determination that the media content is popular, a determination that the media content is sponsored by at least one of an advertiser, a content provider, or a service provider, and/or the like.

In some cases, the one or more notifications associated with the media content may further be hidden or dismissed based on a variety of factors. In a non-limiting example, the one or more notifications may be hidden based at least in part on an expiration of a predetermined amount of time, a movement of a user, a movement of a device, a determination that the media content indicated in the notification has ended, or a determination that a commercial break has ended, and/or the like.

In some embodiments, a user may customize the one or more notifications associated with the media content. A user may be provided with options to customize at least one of a number of the one or more notifications to display, where the one or more notifications are to be displayed on the display device, or how to organize display of the one or more notifications, and/or the like.

Additionally, and/or alternatively, the one or more notifications associated with the media content may further indicate one or more devices that are available to display the media content. Selecting the one or more devices in the notification may cause the one or more devices to display the media content.

Method 300 might further comprise, at block 315, receiving, with the media player, user interaction with the one or more notifications associated with the media content, wherein the user interaction causes at least one of media content currently being viewed by the user to switch with the media content displayed in the one or more notification, the media content to be displayed on a second display device, the media content to be displayed after a program being currently viewed by a user has ended, a preview of the media content to be displayed, a live stream of the media content to be displayed in the notification, the media content to be placed in a queue of additional media content that the user has indicated an interest in viewing, the media content to be recorded, a season of the media content to be recorded, a series of the media content to be recorded, or a recording of the media content to be deleted, and/or the like.

In some embodiments, the method 300, at block 320, might additionally include performing, with the player and/or a display device and based on the user interaction with the one or more notifications associated with the media content, at least one of switching media content currently being viewed by the user with the media content displayed in the one or more notifications, displaying at least one of the media content on a second display device, displaying the media content after a program being currently viewed by a user has ended, displaying a preview of the media content, displaying a live stream of the media content in the one or more notifications associated with the media content, placing the media content in a queue of additional media content that the user has indicated an interest in viewing, recording the media content, recording a season of the media content, recording a series of the media content, or deleting a recording of the media content, and/or the like.

Exemplary System and Hardware Implementation

Figure 4:
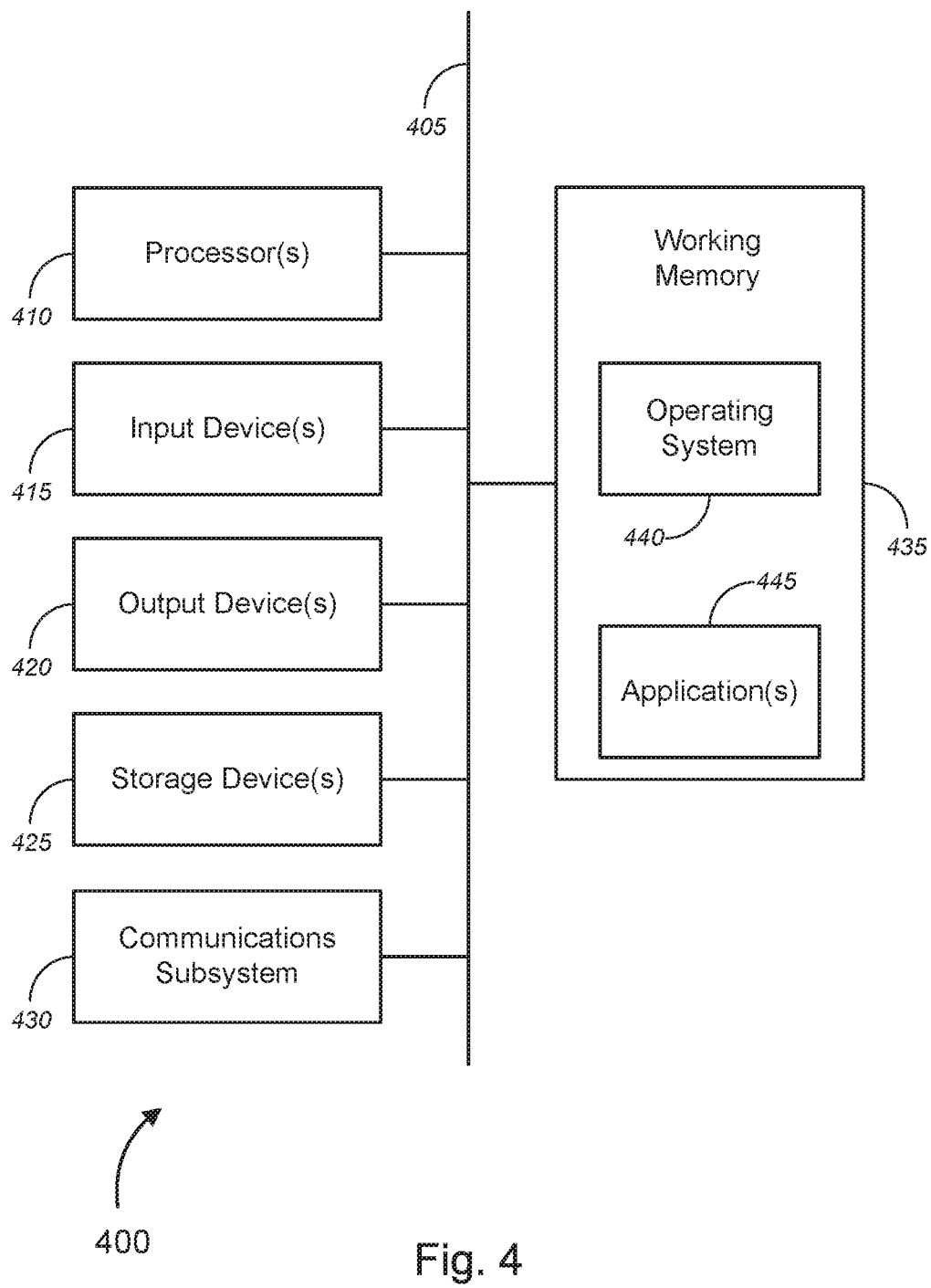
FIG. 4 is a block diagram illustrating an exemplary computer or system hardware architecture, in accordance with various embodiments.

FIG. 4 is a block diagram illustrating an exemplary computer or system hardware architecture, in accordance with various embodiments. FIG. 4 provides a schematic illustration of one embodiment of a computer system 400 of the service provider system hardware that can perform the methods provided by various other embodiments, as described herein, and/or can perform the functions of computer or hardware system (i.e., media player 105, display devices 110, 200, 210, 220, and 230, user interface devices 120, media content sources (or servers) 135, etc.), as described above. It should be noted that FIG. 4 is meant only to provide a generalized illustration of various components, of which one or more (or none) of each may be utilized as appropriate. FIG. 4, therefore, broadly illustrates how individual system elements may be implemented in a relatively separated or relatively more integrated manner.

The computer or hardware system 400—which might represent an embodiment of the computer or hardware system (i.e., media player 105, display devices 110, 200, 210, 220, and 230, user interface devices 120, media content sources (or servers) 135, etc.), described above with respect to FIGS. 1-3—is shown comprising hardware elements that can be electrically coupled via a bus 405 (or may otherwise be in communication, as appropriate). The hardware elements may include one or more processors 410, including, without limitation, one or more general-purpose processors and/or one or more special-purpose processors (such as microprocessors, digital signal processing chips, graphics acceleration processors, and/or the like); one or more input devices 415, which can include, without limitation, a mouse, a keyboard and/or the like; and one or more output devices 420, which can include, without limitation, a display device, a printer, and/or the like.

The computer or hardware system 400 may further include (and/or be in communication with) one or more storage devices 425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 400 might also include a communications subsystem 430, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. In some aspects, the communications subsystem 430 might also comprise a wireless video link system, which might utilize a wireless video link protocol comprising at least one of WirelessHD protocol, Wireless Home Digital Interface ("WHDI") protocol, or Wireless Gigabit Alliance ("WiGig") protocol, and/or the like. The communications subsystem 430 may permit data to be exchanged with a network (such as the network described below, to name one example), with other computer or hardware systems, and/or with any other devices described herein. In many embodiments, the computer or hardware system 400 will further comprise a working memory 435, which can include a RAM or ROM device, as described above.

The computer or hardware system 400 also may comprise software elements, shown as being currently located within the working memory 435, including an operating system 440, device drivers, executable libraries, and/or other code, such as one or more application programs 445, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 400 and/or might take the form of source and/or installable code, which, upon compilation and/or installation on the computer or hardware system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 400) to perform methods in accordance with various embodiments of the invention. According to a set of embodiments, some or all of the procedures of such methods are performed by the computer or hardware system 400 in response to processor 410 executing one or more sequences of one or more instructions (which might be incorporated into the operating system 440 and/or other code, such as an application program 445) contained in the working memory 435. Such instructions may be read into the working memory 435 from another computer readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 400, various computer readable media might be involved in providing instructions/code to processor(s) 410 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 425. Volatile media includes, without limitation, dynamic memory, such as the working memory 435. In some alternative embodiments, a computer readable medium may take the form of transmission media, which includes, without limitation, coaxial cables, copper wire and fiber optics, including the wires that comprise the bus 405, as well as the various components of the communication subsystem 430 (and/or the media by which the communications subsystem 430 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, a removable storage device such as, but not limited to, USB-based Flash storage ("memory stick"), any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 400. These signals, which might be in the form of electromagnetic signals, acoustic signals, optical signals, and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

Figure 5:
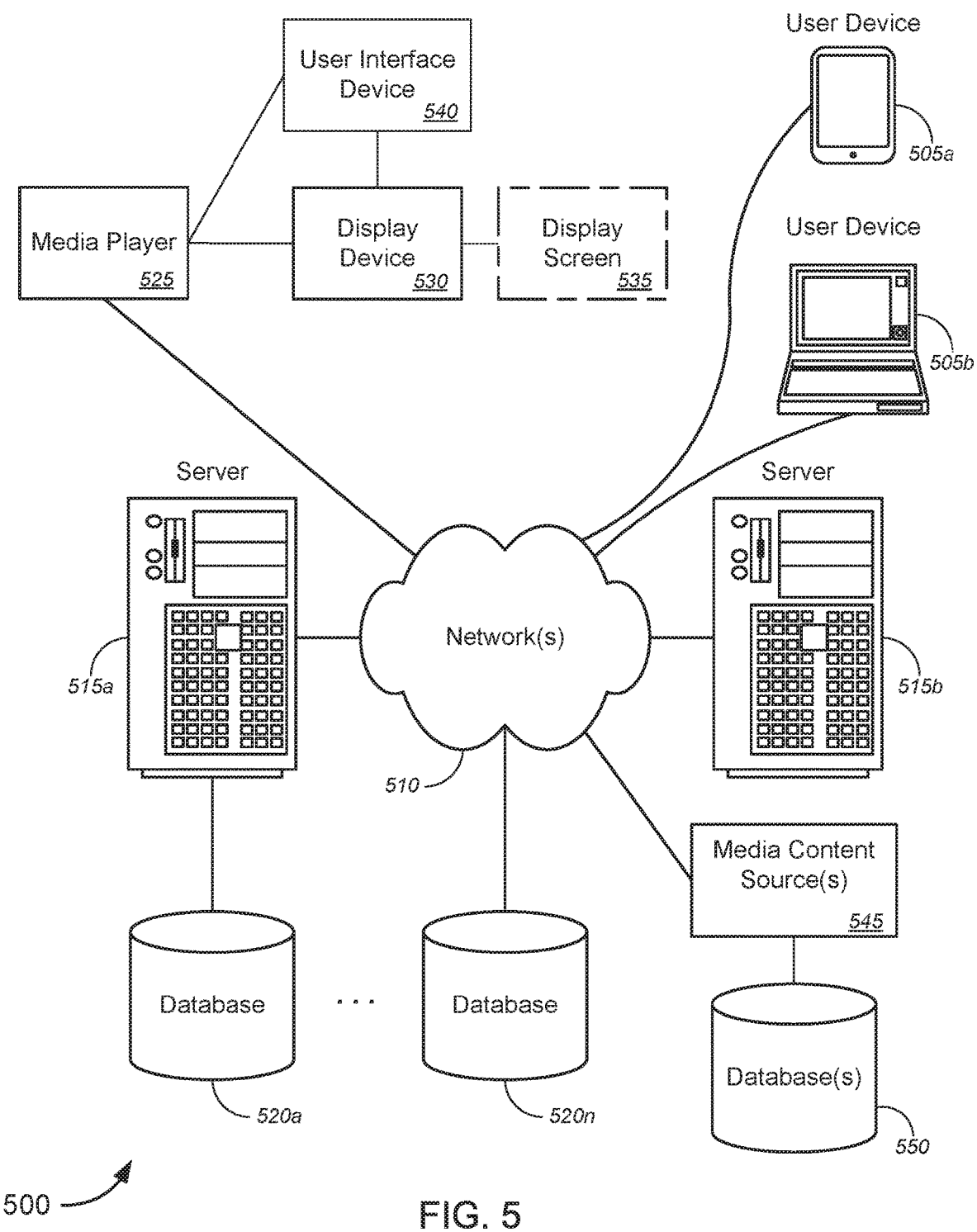
FIG. 5 is a block diagram illustrating a networked system of computers, computing systems, or system hardware architecture, which can be used in accordance with various embodiments.

As noted above, a set of embodiments comprises methods and systems for implementing notifications on a display device, more particularly, to methods, systems, and apparatuses for implementing, interacting with, and displaying notifications associated with media content on a display device. FIG. 5 illustrates a schematic diagram of a system 500 that can be used in accordance with one set of embodiments. The system 500 can include one or more user computers, user devices, or customer devices 505. A user computer, user device, or customer device 505 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 505 can also have any of a variety of applications, including one or more applications configured to perform methods provided by various embodiments (as described above, for example), as well as one or more office applications, database client and/or server applications, and/or web browser applications. Alternatively, a user computer, user device, or customer device 505 can be any other electronic device, such as a thin-client computer, Internet-enabled mobile telephone, and/or personal digital assistant, capable of communicating via a network (e.g., the network(s) 510 described below) and/or of displaying and navigating web pages or other types of electronic documents. Although the exemplary system 500 is shown with two user computers, user devices, or customer devices 505, any number of user computers, user devices, or customer devices can be supported.

Certain embodiments operate in a networked environment, which can include a network(s) 510. The network(s) 510 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 510 (similar to network(s) 130 FIG. 1, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 515. Each of the server computers 515 may be configured with an operating system, including, without limitation, any of those discussed above, as well as any commercially (or freely) available server operating systems. Each of the servers 515 may also be running one or more applications, which can be configured to provide services to one or more clients 505 and/or other servers 515.

Merely by way of example, one of the servers 515 might be a data server, a web server, a cloud computing device(s), or the like, as described above. The data server might include (or be in communication with) a web server, which can be used, merely by way of example, to process requests for web pages or other electronic documents from user computers 505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 505 to perform methods of the invention.

The server computers 515, in some embodiments, might include one or more application servers, which can be configured with one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 505 and/or another server 515. In some embodiments, an application server can perform one or more of the processes for implementing media content streaming or playback, and, more particularly, to methods, systems, and apparatuses for implementing notifications on a display device, more particularly, to methods, systems, and apparatuses for implementing, interacting with, and displaying notifications associated with media content on a display device, as described in detail above. Data provided by an application server may be formatted as one or more web pages (comprising HTML, JavaScript, etc., for example) and/or may be forwarded to a user computer 505 via a web server (as described above, for example). Similarly, a web server might receive web page requests and/or input data from a user computer 505 and/or forward the web page requests and/or input data to an application server. In some cases, a web server may be integrated with an application server.

In accordance with further embodiments, one or more servers 515 can function as a file server and/or can include one or more of the files (e.g., application code, data files, etc.) necessary to implement various disclosed methods, incorporated by an application running on a user computer 505 and/or another server 515. Alternatively, as those skilled in the art will appreciate, a file server can include all necessary files, allowing such an application to be invoked remotely by a user computer, user device, or customer device 505 and/or server 515.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520*a*-520*n* (collectively, "databases 520" or the like). The location of each of the databases 520 is discretionary: merely by way of example, a database 520*a* might reside on a storage medium local to (and/or resident in) a server 515*a* (and/or a user computer, user device, or customer device 505). Alternatively, a database 520*n* can be remote from any or all of the computers 505, 515, so long as it can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505, 515 can be stored locally on the respective computer and/or remotely, as appropriate.) In one set of embodiments, the database 520 can be a relational database, such as an Oracle database, that is adapted to store, update, and retrieve data in response to SQL-formatted commands. The database might be controlled and/or maintained by a database server, as described above, for example.

According to some embodiments, system 500 might further comprise a media player 525 (similar to media player 105 of FIG. 1, or the like), one or more display devices 530 each with display screen(s) 535 (similar to display devices 110, 200, 210, 220, and 230 of FIGS. 1 and 2, or the like), one or more user interface devices 540 (similar to user interface devices 120 of FIG. 1, or the like), one or more media (e.g., video) content sources 545 and corresponding database(s) 550 (similar to media or video content sources (or servers) 135 and corresponding databases 140 of FIG. 1, or the like), and/or the like. In some cases, the media player might comprise one of a set-top box ("STB"), a media player, a gaming console, a server computer, a desktop computer, or a laptop computer, and/or the like. Additionally and/or alternatively, the media player might comprise one of a digital versatile disc or digital video disc ("DVD") player, a Blu-ray disc ("BD") player, a digital video recording ("DVR") device, a streaming video player, a streaming music player, or a streaming game player, and/or the like.

In operation, the media player 525 might receive a video signal from media content source(s) 545 via network(s) 510 (and/or the database(s) 550 via the media content source(s) 545, or the like), might decode the received video signal, might establish a communications link between the media player 525 and the one or more display devices 530, and might send the decoded video signal to the one or more display devices 530.

Additionally and/or alternatively, in operation, the media player 525 might receive one or more notifications associated with media content from media content source(s) 545, from the database(s) 550 via the media content source(s) 545, from one or more other databases communicatively coupled to the media player 525 via network(s) 510, and/or the like, might establish a wireless communications link between the media player 525 and the one or more display devices 530, and might send the one or more notifications associated with media content to the one or more display devices 530.

The media player 525 and/or display device 530 may then display the one or more notifications associated with the media content on the display screen 535. The media content may include, without limitation, textual content, audio content, image content, or video content, and/or the like. A user may interact with the one or more notifications associated with the media content via user interface device 540. The user interaction may cause at least one of the media content currently being viewed by the user to switch with the media content displayed in the one or more notifications, the media content to be displayed on a second display device, the media content to be displayed after a program being currently viewed by a user has ended, a preview (e.g., at least one of a trailer or excerpt, a movie poster, a looped presentation of still images, or metadata about the content (title, director(s), actor(s), participant(s), location information, trivia, etc.), and/or the like) of the media content to be displayed, a live stream of the media content to be displayed in the notification, the media content to be placed in a queue of additional media content that the user has indicated an interest in viewing, the media content to be recorded, a season of the media content to be recorded, a series of the media content to be recorded, a recording of the media content to be deleted, and/or the like. In some cases, the user interaction may additionally and/or alternatively cause the media content displayed in the notification to switch places with the media content currently being viewed by a user. In other words, the media content displayed in the notification may be displayed on the entire display screen 535 while the media content that was currently being viewed by a user is displayed in the one or more notifications.

These and other functions of the system 500 (and its components) are described in greater detail above with respect to FIGS. 1-3.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
  receiving, with a media player, one or more notifications associated with a first media content;
  displaying, with the media player, the one or more notifications associated with the first media content on a first display device, wherein displaying the one or more notifications associated with the first media content comprises causing the one or more notifications to scroll across a side of a screen of the first display device, and wherein, when at least one notification of the one or more notifications associated with the first media content is selected, the one or more notifications pause scrolling across the side of the screen of the first display device;

dismissing or displaying, with the media player, the one or more notifications associated with the first media content on the first display device, based on a gesture of a user; and receiving, with the media player, user input indicating user interaction with the one or more notifications associated with the first media content, wherein the user input causes at least one of a second media content currently being viewed by the user to switch places with the first media content displayed in at least one of the one or more notifications, the first media content to be displayed on a second display device, the first media content to be displayed after a program being currently viewed by the user has ended, a preview of the first media content to be displayed, a live stream of the first media content to be displayed in the notification, the first media content to be placed in a queue of additional media content that the user has indicated an interest in viewing, the first media content to be recorded, a season of the first media content to be recorded, a series of the first media content to be recorded, or a recording of the first media content to be deleted, wherein the gesture of the user toward a perimeter of the first display device dismisses the one or more notifications, and wherein the gesture of the user toward a center of the first display device reveals the one or more notifications.

2. The method of claim 1, wherein the media player comprises one of a set-top box ("STB"), a digital video recording ("DVR") device, a phone, a desktop computer, a laptop computer, a tablet, a software application running on a disc player, a software application running on a dedicated media hardware player, a server computer, a cloud-based computing system, or a gaming console.

3. The method of claim 1, wherein the first display device and the second display device each comprises at least one of a television, a smart television, a video projection system, a phone, a desktop computer, a laptop computer, or a tablet.

4. The method of claim 1, wherein the one or more notifications are displayed based at least in part on at least one of movement by a user, movement of a device, a determination that the first media content indicated by the one or more notifications is about to start, a determination that a commercial break has started, or a determination that a program that a user is viewing has ended.

5. The method of claim 1, wherein the one or more notifications associated with the first media content are displayed in a corner of a screen of the first display device.

6. The method of claim 1, wherein the one or more notifications associated with the first media content are displayed until a program a user is viewing ends or until the first media content indicated in the one or more notifications ends.

7. The method of claim 1, wherein the one or more notifications associated with the first media content are dismissed when the one or more notifications scrolling across the side of the screen of the first display device reach an end of the side of the screen of the first display device.

8. The method of claim 1, wherein the one or more notifications are organized based at least in part on at least one of viewing history of the user, views of friends, trends, ratings, live content, video on demand content, or recorded content.

9. The method of claim 1, wherein a first video content is displayed in at least one notification of the one or more notifications associated with the first media content, and wherein the first video content is at least one of currently broadcasting video content associated with the first media content indicated in the one or more notifications or a preview of the first media content indicated in the one or more notifications.

10. The method of claim 9, wherein selecting at least one notification of the one or more notifications displaying the first video content causes the first video content in the at least one notification to be displayed on a main screen of the first display device and the second media content that was previously displayed on the main screen to be displayed in the at least one notification.

11. The method of claim 9, wherein, after a predetermined amount of time has passed, the first display device hides the second media content being displayed in the at least one notification and continues to display the first video content on the main screen of the first display device.

12. The method of claim 9, wherein, after a predetermined amount of time has passed, the first display device dismisses the first video content being displayed on the main screen and displays the second media content that was previously displayed on the main screen and that is currently being displayed in the at least one notification on the main screen of the display.

13. The method of claim 1, wherein the one or more notifications associated with the first media content are displayed based at least in part on at least one of a determination that the first media content is associated with viewing habits of a user, a determination that the first media content is associated with a recording history of the user, a determination that one or more friends of the user are interested in the first media content, a determination that the first media content is trending, a determination that the first media content is popular, or a determination that the first media content is sponsored by an advertiser, content provider, or a service provider.

14. The method of claim 1, wherein the one or more notifications are hidden based at least in part on at least one of an expiration of a predetermined amount of time, a movement of a user, a movement of a device, a determination that the first media content indicated in the notification has ended, or a determination that a commercial break has ended.

15. The method of claim 1, wherein a user is provided with options to customize at least one of a number of the one or more notifications to display, where the one or more notifications are to be displayed on the first display device, or how to organize display of the one or more notifications.

16. The method of claim 1, wherein the one or more notifications associated with the first media content further indicate one or more devices that are available to display the first media content, wherein selecting the one or more devices causes the one or more devices to display the first media content.

17. The method of claim 1, wherein the one or more notifications are hidden based at least in part on at least one of a determination that the first media content indicated in the one or more notifications has ended or a determination that a commercial break has ended.

18. A media player, comprising:
   at least one processor; and a non-transitory computer readable medium communicatively coupled to the at least one processor, the non-transitory computer readable medium having stored thereon computer software comprising a set of instructions that, when executed by the at least one processor, causes the media player to:

receive one or more notifications associated with a first media content;

display the one or more notifications associated with the first media content on a first display device, wherein displaying the one or more notifications associated with the first media content comprises causing the one or more notifications to scroll across a side of a screen of the first display device, and wherein, when at least one notification of the one or more notifications associated with the first media content is selected, the one or more notifications pause scrolling across the side of the screen of the first display device;

dismiss or display the one or more notifications associated with the first media content on the first display device, based on a gesture of a user; and receive user input indicating user interaction with the one or more notifications associated with the first media content, wherein the user input causes at least one of a second media content currently being viewed by the user to switch places with the first media content displayed in at least one of the one or more notifications, the first media content to be displayed on a second display device, the first media content to be displayed after a program being currently viewed by the user has ended, a preview of the first media content to be displayed, a live stream of the first media content to be displayed in the notification, the first media content to be placed in a queue of additional media content that the user has indicated an interest in viewing, the first media content to be recorded, a season of the first media content to be recorded, a series of the first media content to be recorded, or a recording of the first media content to be deleted, wherein the gesture of the user toward a perimeter of the first display device dismisses the one or more notifications, and wherein the gesture of the user toward a center of the first display device reveals the one or more notifications.

19. A system, comprising:
a media player, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the media player to:
receive one or more notifications associated with a first media content;

display the one or more notifications associated with the first media content on one or more first display devices, wherein displaying the one or more notifications associated with the first media content comprises causing the one or more notifications to scroll across a side of a screen of at least one first display device of the one or more the first display devices, and wherein, when at least one notification of the one or more notifications associated with the first media content is selected, the one or more notifications pause scrolling across the side of the screen of the at least one first display device;

dismiss or display the one or more notifications associated with the first media content on the at least one first display device, based on a gesture of a user; and receive user input indicating user interaction with the one or more notifications associated with the first media content, wherein the user input causes at least one of a second media content currently being viewed by the user to switch places with the first media content displayed in at least one of the one or more notifications, the first media content to be displayed on one or more second display devices, the first media content to be displayed after a program being currently viewed by the—a-user has ended, a preview of the first media content to be displayed, a live stream of the first media content to be displayed in the notification, the first media content to be placed in a queue of additional media content that the user has indicated an interest in viewing, the first media content to be recorded, a season of the first media content to be recorded, a series of the first media content to be recorded, or a recording of the first media content to be deleted; and the one or more first display devices, each comprising:
a display screen;
at least one second processor; and
a second non-transitory computer readable medium communicatively coupled to the at least one second processor, the second non-transitory computer readable medium having stored thereon computer software comprising a second set of instructions that, when executed by the at least one second processor, causes the display device to:
receive the second media content;
display, on the display screen, the received second media content;
receive the one or more notifications associated with the first media content from the media player; and
display, on a portion of the display screen, the one or more notifications associated with the first media content,
wherein the gesture of the user toward a perimeter of the first display device dismisses the one or more notifications, and wherein the gesture of the user toward a center of the first display device reveals the one or more notifications.

* * * * *